United States Patent [19]

Bayer

[11] Patent Number: 5,242,360
[45] Date of Patent: Sep. 7, 1993

[54] SPINDLE AND TOOLHOLDER FOR MACHINE TOOL

[75] Inventor: Jack L. Bayer, Phoenix, Ariz.

[73] Assignee: Acroloc, Inc., Phoenix, Ariz.

[21] Appl. No.: 920,125

[22] Filed: Jul. 24, 1992

[51] Int. Cl.$^5$ .................. B23Q 3/157; B23B 47/04; B23C 1/06
[52] U.S. Cl. .................. 483/36; 408/238; 409/231
[58] Field of Search .......... 409/231; 408/238, 239 R; 483/32, 36

[56] References Cited

U.S. PATENT DOCUMENTS

| | | | |
|---|---|---|---|
| 2,811,877 | 11/1957 | DeGroff | 408/130 |
| 3,185,038 | 5/1965 | Lanzenberger | 409/231 X |
| 3,797,956 | 3/1974 | Bayer et al. | 409/231 X |
| 3,893,371 | 7/1975 | Frazier | 409/231 X |
| 3,999,769 | 12/1976 | Bayer et al. | 29/26 A |
| 4,008,646 | 2/1977 | Hague et al. | 408/239 R |
| 4,008,647 | 2/1977 | Hague et al. | 409/231 |
| 4,443,929 | 4/1984 | Bayer et al. | 483/32 |
| 4,480,366 | 11/1984 | Takahashi et al. | 29/26 A |
| 4,604,008 | 8/1986 | Bone | 409/231 |
| 4,640,653 | 2/1987 | Schartzman | 408/239 R |
| 4,688,970 | 8/1987 | Eckman | 408/9 |
| 4,748,357 | 5/1988 | Kempken | 409/233 X |
| 4,842,457 | 6/1989 | Badagnani | 409/231 |
| 4,919,575 | 4/1990 | Yoshimi et al. | 409/231 |
| 4,957,398 | 9/1990 | Schneider et al. | 409/233 |
| 4,997,324 | 5/1991 | Shirai et al. | 408/238 X |
| 5,020,968 | 6/1991 | Yamada et al. | 409/231 X |
| 5,033,922 | 7/1991 | Watanabe et al. | 408/239 R |

Primary Examiner—William Briggs
Attorney, Agent, or Firm—Woodward, Emhardt, Naughton, Moriarty & McNett

[57] ABSTRACT

In a vertical machining center, a tubular spindle-drive sleeve rotates about its longitudinal axis while axially immovable. A spindle is axially slidable in and rotatably driven by the sleeve. A linear drive, non-rotating ball screw connected to the upper end of the spindle is driven axially by a powered ball nut to advance and retract the spindle in the sleeve. A coupling plug fixed at the bottom of the spindle connects to any one of various toolholders in a turret. Axial movement of the spindle by the ball nut automatically couples and decouples the spindle to and from the toolholder. Gaseous or liquid fluid supply down through the spindle is provided. In one embodiment, an air motor is mounted inside the spindle and coupled to a second spindle in the changeable toolholder to supplement the main spindle drive and drive the toolholder spindle for driving a cutting tool at a much higher rotational rate than is possible with the main spindle alone.

21 Claims, 5 Drawing Sheets

SPINDLE AND TOOLHOLDER FOR MACHINE TOOL

BACKGROUND OF THE INVENTION

1. Field of the Invention

This invention relates generally to machine tools, and more particularly to the spindle mount and drive and toolholder for a machine tool with automatic toolchanger.

2. Description of the Prior Art

The machine tool art is extensive. Vertical milling machines constitute a large component of the machine tool art. Typically they include a horizontally positionable table to hold the workpiece, a tool (usually a cutter of some type) for treating the workpiece, a powered rotating spindle for rotating the tool and vertically drivable by hand or power to advance the tool into the workpiece. More recent machines are controlled by computer and, due to their versatility, are commonly referred to as computer numerically controlled, or CNC, machining centers. They are usually equipped with some kind of automatic tool changing feature to enable the machine to make different types, sizes and contours of cuts, some of them including means for translating the workpiece mounting table or the spindle on horizontal axes automatically for contouring.

A machining center having such features is shown and described in U.S. Pat. No. 4,443,929 issued Apr. 24, 1984 to me and Walter Breitkopf. It uses an automatic tool changing feature as disclosed in more detail in U.S. Pat. No. 3,999,769 issued Dec. 28, 1976 to me and Walter Breitkopf, and which, for some features, refers to our earlier U.S. Pat. No. 3,797,956 issued Mar. 19, 1974. In that system, and referring to the reference numerals in the earlier U.S. Pat. No. 3,999,769, toolholders 58 were removably mounted in retaining rings 48 mounted in a rotatable turret plate 44 which could be indexed to place the axis of any one of the toolholders in line with a coupling plug 36 at the bottom of the tool drive spindle 30. When the turret plate was rotated to place the desired toolholder directly under and in axial alignment with the spindle, the spindle was driven downward by the spindle mounting sleeve 24 in FIG. 2 of that patent for engagement of the coupling plug 36 on the spindle with the toolholder. Further downward drive of the spindle drove the toolholder out of the turret plate and into position to engage the cutting tool therein (not shown) with the workpiece. The spindle drive motor was energized to rotate the spindle for the cutting operation, while the sleeve 24 did not rotate. The purpose of the sleeve was to contain and rotatably support the spindle and drive the spindle up and down in the housing 22. When the machining with the cutter in that toolholder was complete, the spindle sleeve was retracted and, when the plug had been pulled up to the position shown in FIG. 2, the toolholder was released into and secured in the retaining ring 48 in the turret disk. Then the turret plate 44 could be rotatably indexed to place the next desired toolholder in position under the spindle whereupon the spindle would be driven downward to connect it to the toolholder and drive the toolholder and associated tool out of the disk to engage the tool with the workpiece. The disclosures of the above-mentioned patents are incorporated herein by reference.

In machine tools, it is generally desirable to have a high degree of rigidity so that the surface which is treated (usually by cutting) on the workpiece is well within acceptable tolerance. Cutting forces transverse to the rotational axis of the tool tend to cause a bending moment from the cutter to the spindle support. The result is a certain amount of radial deflection of the spindle caused by the cutting forces. Therefore, it is an object of this invention to improve rigidity of a spindle within dimensional constraints of a machine structure.

In many machining operations, it is desirable to be able to apply a coolant to the cutting site. This is frequently done by the use of an air or liquid coolant nozzle located in the vicinity of the cutting site in the effort to direct the coolant to the cutting site. This may require some operator attention to be sure that the coolant is being applied at the proper location as different tools are applied to different locations on the workpiece. Also, and particularly where automatic tool changing is a feature of the machine, it is desirable to be certain that chips or other debris from one cutting operation do not interfere with the mating of the spindle with the next toolholder that is to be used in the succession of operations. Therefore, it is an object of this invention to provide a means whereby, in at least one embodiment, fluids can be transmitted directly down through the spindle to the toolholder.

Some combinations of cutting tools and workpiece materials perform more effectively at higher speeds. To establish optimum structural rigidity in the machine tool, the bearing size is such that, at speeds above 9,000 rpm, the bearings tend to get hot. Yet there are some applications where speeds much higher than 9,000 rpm are desirable. It is another object of the present invention to enable a machining center to perform machining operations at a much wider range of cutter speeds than heretofore available, and enable doing so with automatic tool changing features.

SUMMARY OF THE INVENTION

Described briefly, according to a typical embodiment of the present invention, a machining center has a frame in which an elongated spindle drive sleeve is mounted for rotation about its longitudinal axis while confined to avoid axial movement. A spindle is slidably received in the sleeve for axial movement therein. A spindle drive motor is coupled to the sleeve to drive the sleeve and thereby the spindle, in rotation. A linear drive screw is connected to one end of the spindle and on the spindle axis and driven axially by a powered nut to advance and retract the spindle in the sleeve. A coupling plug is provided at the other end of the spindle for connecting to any one of a variety of toolholders mounted in a magazine, the toolholders being capable of holding and gripping a workpiece treating tool. Advance of the spindle by the rotary nut arrangement facilitates coupling and decoupling the spindle with and from, respectively, the toolholder. Means are provided for supply of gaseous or liquid fluid down through the spindle to the toolholder. In one embodiment, a fluid motor is mounted inside the spindle and coupled to a second spindle in the toolholder to supplement the original spindle drive and drive the toolholder spindle for driving a cutting tool at a much higher rotational rate than is possible with the main spindle alone.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
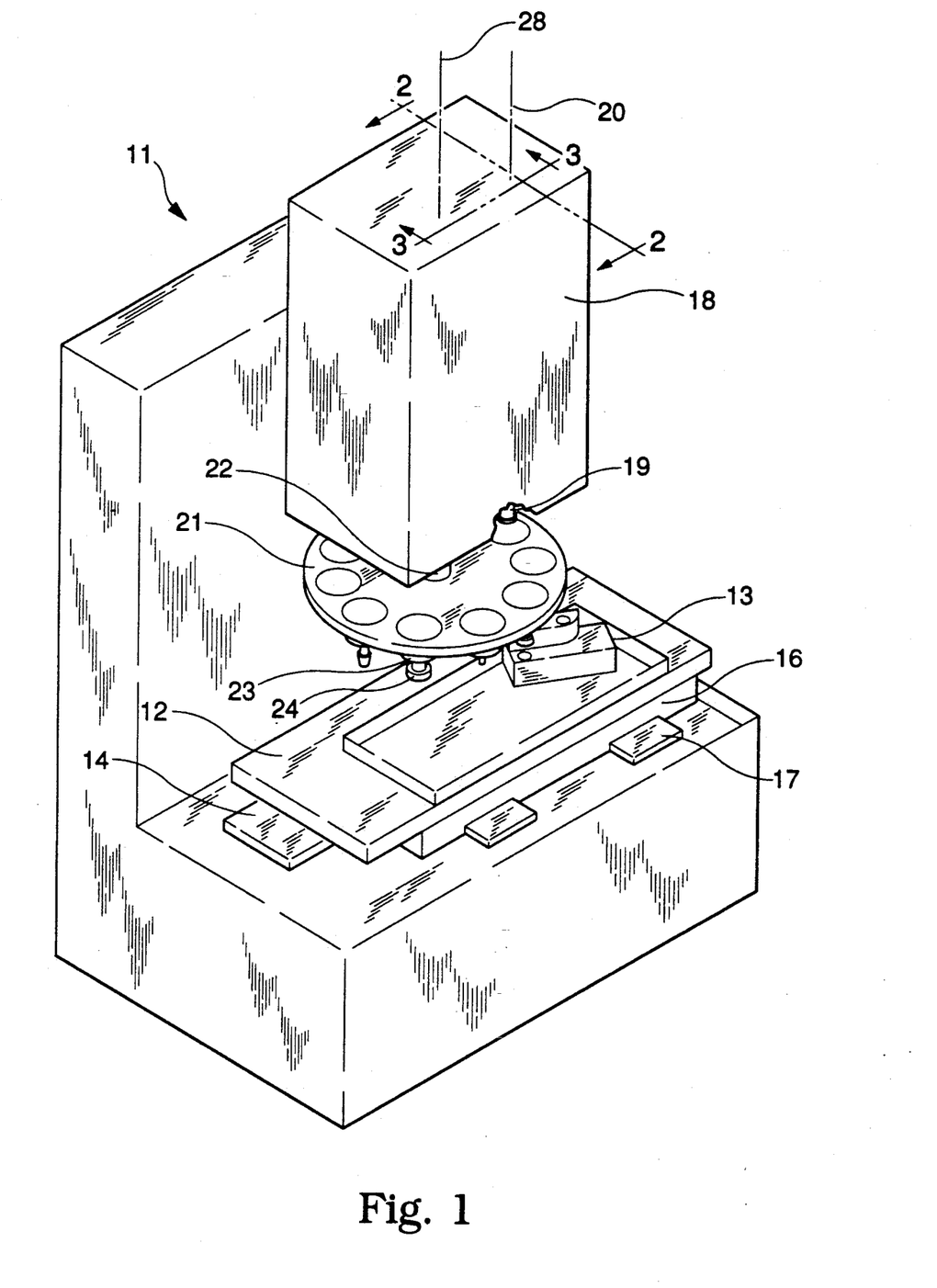
FIG. 1 is a very schematic pictorial view of a machining center incorporating the present invention.

Referring now to the drawings in detail, FIG. 1 shows in a very schematic way, a vertical machining center 11 having a table 12 on which the workpiece 13 is secured. The table is mounted for rectilinear translation on the ways 14 of carriage 16 for X-axis movement, with the carriage 16 mounted on ways 17 on the base for Y-axis movement.

A head 18 is secured to the machine and encloses a spindle constructed and mounted in a manner according to the present invention and which has a coupling plug 19 at the lower end of the spindle and rotatable with the spindle on axis 20.

A toolholder carrier turret plate 21 is secured to a shaft 22 mounted in the head 18 and has a plurality of circularly spaced apertures with retaining rings therein holding a plurality of toolholders such as 23, each toolholder holding a tool such as 24 for a particular type of machining operation to be performed by that tool on the workpiece 13. Rotary drive for the turret plate 21 is provided in the head 18 and is able to position any one of the toolholders under the coupling plug 19. A computer numerical controller (not shown) is coupled to the drive motors for the X-Y carriages and the toolholder turret to position the workpiece and toolholders according to a programmed sequence predetermined for the necessary operations on the workpiece 13. Means for doing this are all known in the art. Examples are the Acroloc Models AD12-20, AD15-32 and AD15-40 CNC Vertical Machining Centers manufactured by the assignee of this application.

Figure 2A:
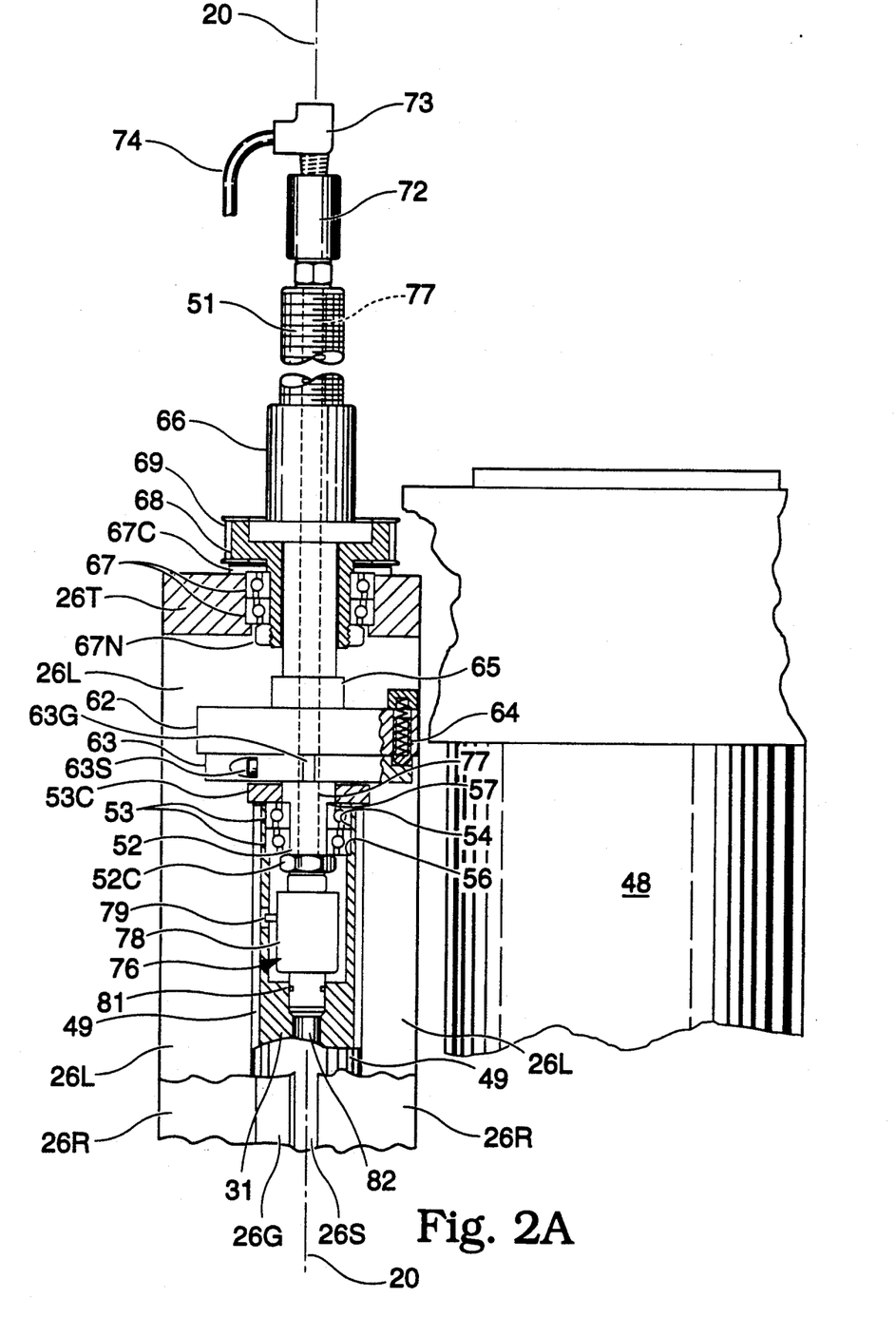
FIG. 2A is a vertical section through the upper portion of the spindle and sleeve assembly taken on a vertical plane 2—2 in FIG. 1 containing the rotational axis of the spindle assembly, and viewed in the direction of the arrows.
Figure 2B:
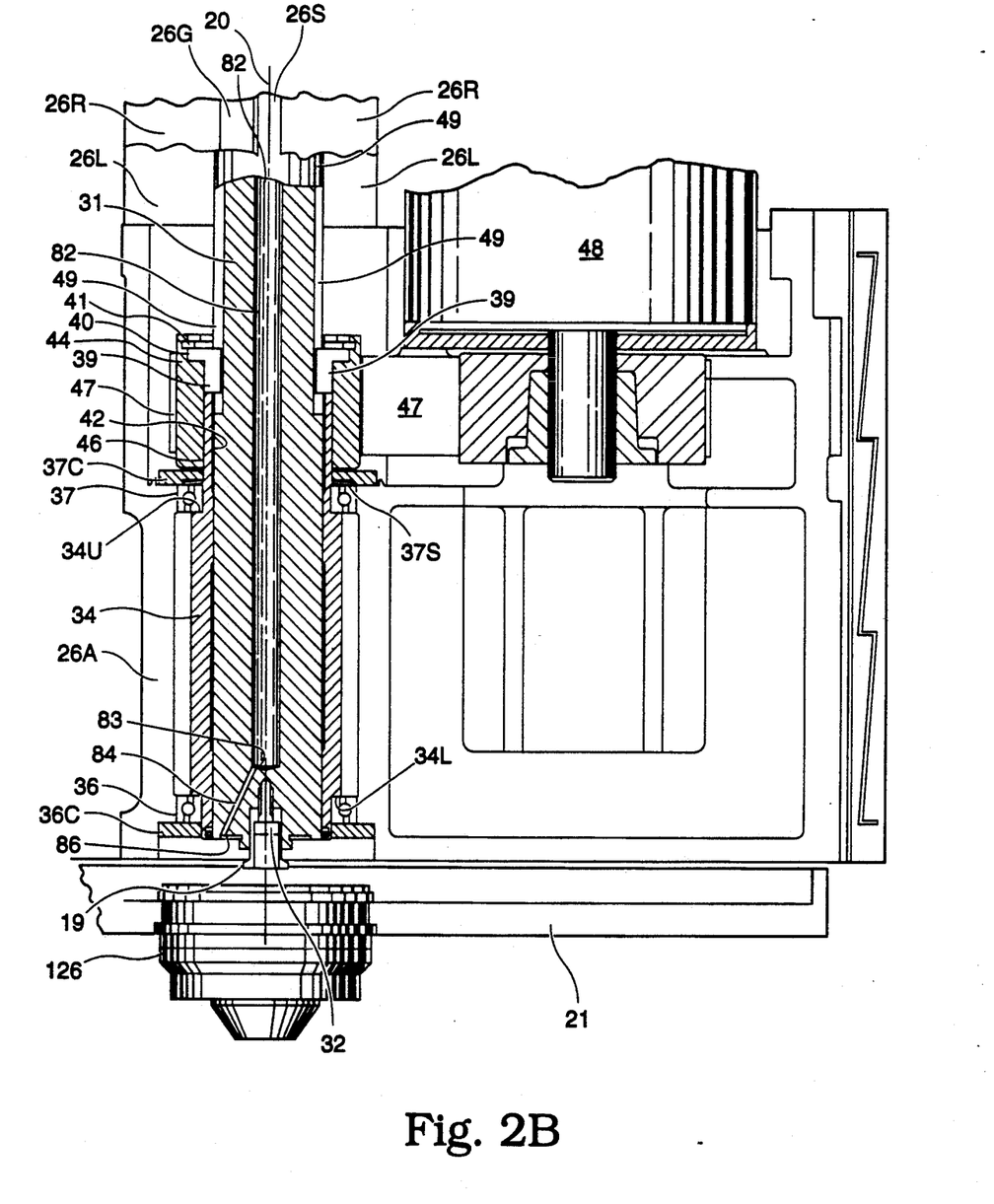
FIG. 2B is a vertical section through the lower portion of the spindle and sleeve assembly and taken on the same plane 2—2 in FIG. 1 containing the rotational axis.
Figure 3:
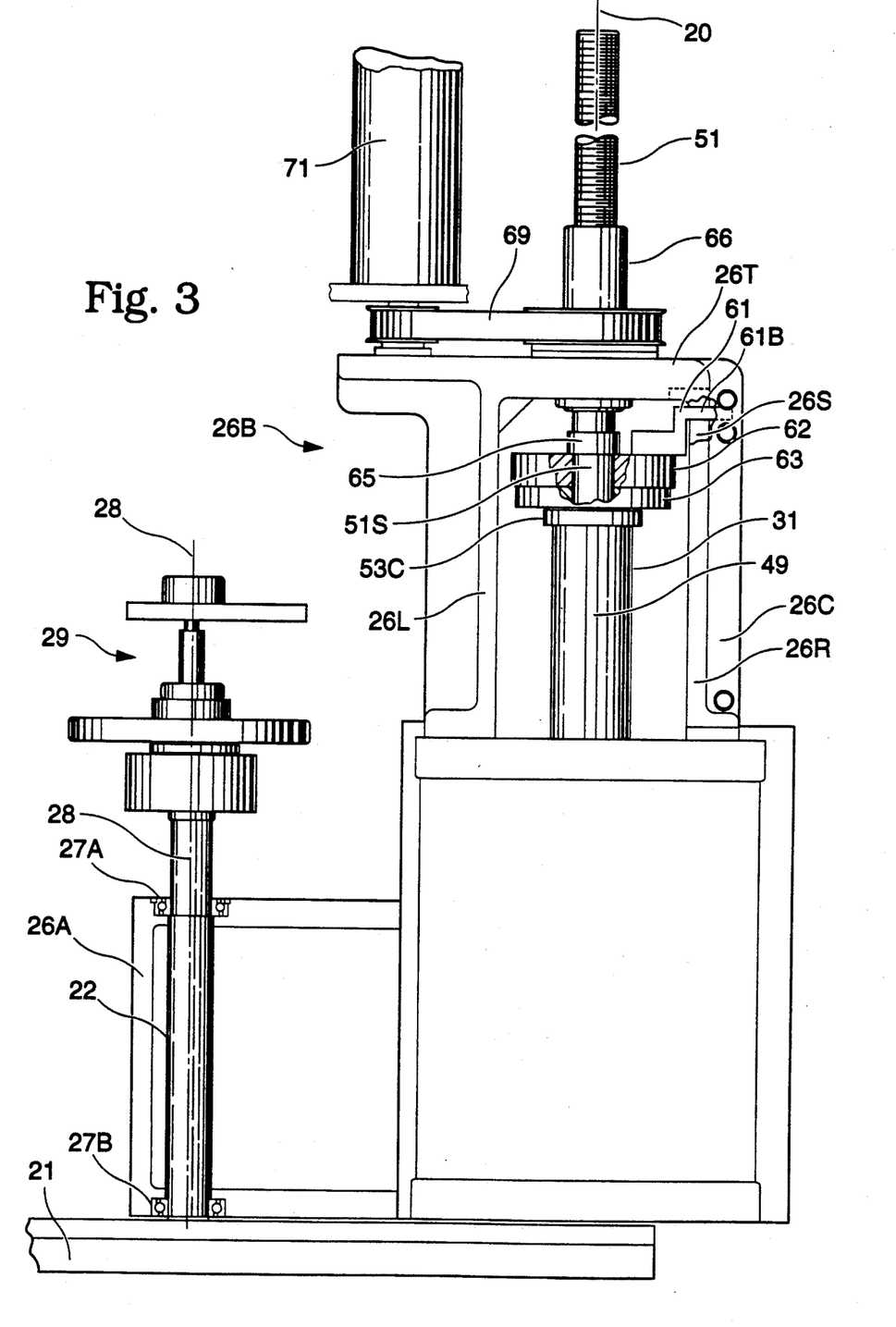
FIG. 3 is an elevational view of the spindle and sleeve assembly and part of the turret drive but taken at the plane and viewed in the direction of the arrows 3—3 in FIG. 1.

Referring now to FIGS. 2A, 2B and 3, there is shown a structure which is mounted inside the head 18 of FIG. 1. It includes a frame comprising head casting 26A and Z drive housing 26B secured to the head casting. The Z drive housing is a casting of 319 aluminum having a generally inverted U-shape with left-hand and right-hand columns 26L and 26R (FIG. 3) and top bridging portion 26T. A rib or gusset reinforces each column. At the right, and as shown in FIGS. 2A and 2B, and in the broken out portion of column 26R in FIG. 3, there is a slot 26 immediately beside gusset 26G and which extends the height of column 26R from above its base to the top 26T. Its purpose is described hereinafter.

Upper and lower bearings 27A and 27B mounted in the head casting 26A support the turret shaft 22 for rotation on the axis 28. Turret drive and indexing features are designated generally at 29 but are of a type known in the art and not a part of this invention so not shown or described in further detail herein.

The tool drive spindle 31 has the coupling plug 19 of FIG. 1 fastened in a socket at its lower end by the socket head cap screw 32. For rigidity of the spindle and resistance to bending due to cutting forces, the spindle is mounted and controlled according to the invention by fitting it in an elongate cylindrical sleeve 34 having lower and upper shoulders 34L and 34U receiving the inner races of lower and upper ball bearing assemblies 36 and 37, respectively, whose outer races are slip fitted in the frame and clamped in place so that the sleeve 34, while freely rotatable about the spindle axis 20, cannot move axially. The lower spindle mounting bearing outer race is clamped in the frame pocket by clamp ring 36C secured to the frame by six socket head cap screws (not shown). The upper spindle mounting bearing outer race is spring forced down to pre-load the top and bottom bearings. For this purpose, a belville spring 37S is clamped in the frame pocket by the clamp ring 37C secured to the frame by six circularly spaced socket head cap screws (not shown). The upper and lower spindle-mounting bearings are pre-loaded for zero axial and radial relative movement between the races. The spindle 31 itself is vertically slidable in the sleeve 34. The sleeve I.D. to spindle O.D. clearance is 0.0002 to 0.0004 inches. Two L-shaped keys 39 having square cross section and outwardly projecting arms 40 are mounted in upwardly opening slots in the upper end of the bore 42 of the sleeve 34 at diametrically opposite locations thereon. The arms 40 of these keys are received in pockets in the upper end of the pulley 44 and retained there by a snap ring 41. The internal bore of pulley 44 is fittingly received on the outer cylindrical surface 46 of the sleeve. The pulley is driven by a poly V-belt 47 and which is driven by the spindle drive motor 48. The keys 39 are received in vertically extending keyways 49 in the spindle whereby the spindle is drivable in rotation regardless of its axial position in the sleeve 34.

Referring to FIG. 2A, the axial positioning drive of the spindle is achieved according to another feature of the present invention. It includes a ball screw 51 having a stem 52 at its lower end coupled by two ball bearing assemblies 53 to the upper end of the spindle 31. The inner races of the bearings are slip fitted onto the stem 52 and clamped against the ball screw shoulder by clamp ring nut 52C screwed onto the threaded lower end of stem 52. The outer races are slip fitted into the cylindrical pocket 54 in the upper end of the spindle and clamped in place by ring 53C fastened to the top of the spindle 31 by six circularly spaced socket head cap screws (not shown). The slip fit tolerance is 0.0004 loose to 0.0002 inches tight. The sides of the bearing races are clamped against each other, and the outer race of the lower bearing abuts against the shoulder 56 in the spindle and the inner race of the upper bearing abuts against the shoulder 57 of the ball screw, and the bearings are pre-loaded ball bearings so that there is no relative axial or radial movement between the ball screw 51 and the spindle 31.

The use of the ball bearing connection between the ball screw and the spindle enables free rotation of the spindle with respect to the ball screw 51, the latter being held against rotation by an anti-rotation system which includes anti-rotation bar 61 (FIG. 3) fastened to housing 62 which rests on top of the clutch-disk 63 which is split on a radius at 63G (FIG. 2A) for a slip fit onto the smooth surface 51S (FIG. 3) of screw 51 and thereupon clamped to the screw 51 by screw 63S spanning the split. A split collar 65 is clamped on screw 51 immediately above housing 62. There is a spring-loaded detent pin 64 vertically slidable downward in the housing 62 and with its rounded lower end received in a detent groove in the clutch disk 63 and maintained there by the loading spring, to keep the clutch disk indexed to the housing and, thereby to the anti-rotation bar. The collar 65 prevents the housing 62 from sliding upward on the screw 51 and separating from disk 63. The bar is prevented from rotation in the frame by confinement of the outboard bar portion 61B in the vertically extending slot 26S in the right-hand column 26R of the Z drive housing. In this way, the ball screw can move vertically but without rotation while the spindle rotates. If, because of the spindle being driven down against a stop or the tool crashing on the workpiece, the torque transmitted to the detent pin rises too high, the clutch disk 63 will start to turn and push the detent pin up and out of the notch in clutch so the ball screw can begin to turn with the ball nut and avoid excessive damage.

Referring to FIG. 2A, vertical drive for the ball screw is provided by the ball nut 66 which is mounted by two ball bearing assemblies 67 in the Z drive housing top 26T in a manner similar to the mounting of the ball screw to the spindle. The outer races of the bearing assemblies 67 are slip fitted into the top 26T and clamped in place by ring 67C fastened to top 26T by six circularly spaced cap screws (not shown). The outer race of the lower bearing assembly 67 is abuttingly engaged with the upwardly facing shoulder in the pocket of the top 26T. The inner races are slip fitted to the ball nut. The inner race of the upper bearing assembly abuts the downwardly facing shoulder on a sprocket portion 68 of the ball nut. The inner race of the lower bearing assembly is clamped against the inner race of the upper bearing assembly by the nut 67N screwed onto the threaded lower end of the ball nut 66. Because the ball bearing assemblies 67 are pre-loaded, there is no axial or radial movement of the ball nut assembly 66 relative to the housing top 26T. The exterior surface of the ball nut assembly is machined at 68 to form the above-mentioned sprocket portion to receive the timing belt 69 drivable by the servo motor 71 (FIG. 3) to drive the spindle downward (advance direction) during rotation of the motor in one direction, and drive the spindle upward (retract direction), during drive of the motor in the opposite rotational direction.

Another feature of the invention is the provision of means for supplying fluid through the spindle to its lower end. For this purpose, a rotary seal assembly 72 is screwed into the upper end of the ball screw 51. It receives a fitting 73 coupling a flexible hose 74 to it. Thus there is a passageway from the hose 74 to the central passageway 77 in the ball screw. Another rotary seal assembly 76 is screwed into the lower end of the ball screw. The body 78 of the rotary seal assembly 76 has a pin 79 extending radially outward into an aperture in the spindle 31 so as to turn with the spindle. An O-ring 81 seals the lower end stem of the seal assembly in the upwardly opening pocket in the spindle. An axially extending passageway 82 extends from the bottom of the pocket to a point 83 (FIG. 2B) near the bottom of the spindle from which the passageway 84 extends to an outlet 86 at the bottom of the spindle. Thus, a complete passageway from the hose 74 to the outlet 86 is established. This can be used to convey air or other gas or a liquid coolant to the lower end of the spindle for whatever purpose it may be useful. An example of the rotary seal is Deublin No. 1106-000-002.

Upon comparison of the lower end of the spindle with the spindle of the prior invention disclosed in the above-mentioned Pat. No. 3,999,769, it will be recognized that the present invention enables the use of the automatic tool changing feature covered by that patent, and provide additional advantages of applying the axial force to advance the spindle along the center of rotation of the spindle, and providing means to conduct fluid directly through the spindle to clean and cool the toolholder and cutter, and reduce radial deflection of the spindle caused by cutting forces.

It was mentioned above that it is desirable for some materials to be able to operate a cutter at a much higher speed than is normally feasible with conventional spindle drives. One way used to achieve that result was employment of a planetary gear set in an attachment to a toolholder as disclosed in the aforementioned U.S. Pat. No. 4,443,929. It has remained desirable to provide greater flexibility in speed selection and range. This is achieved according to another feature of the present invention as shown in the embodiment of FIG. 4 herein and which will be described now.

Figure 4:
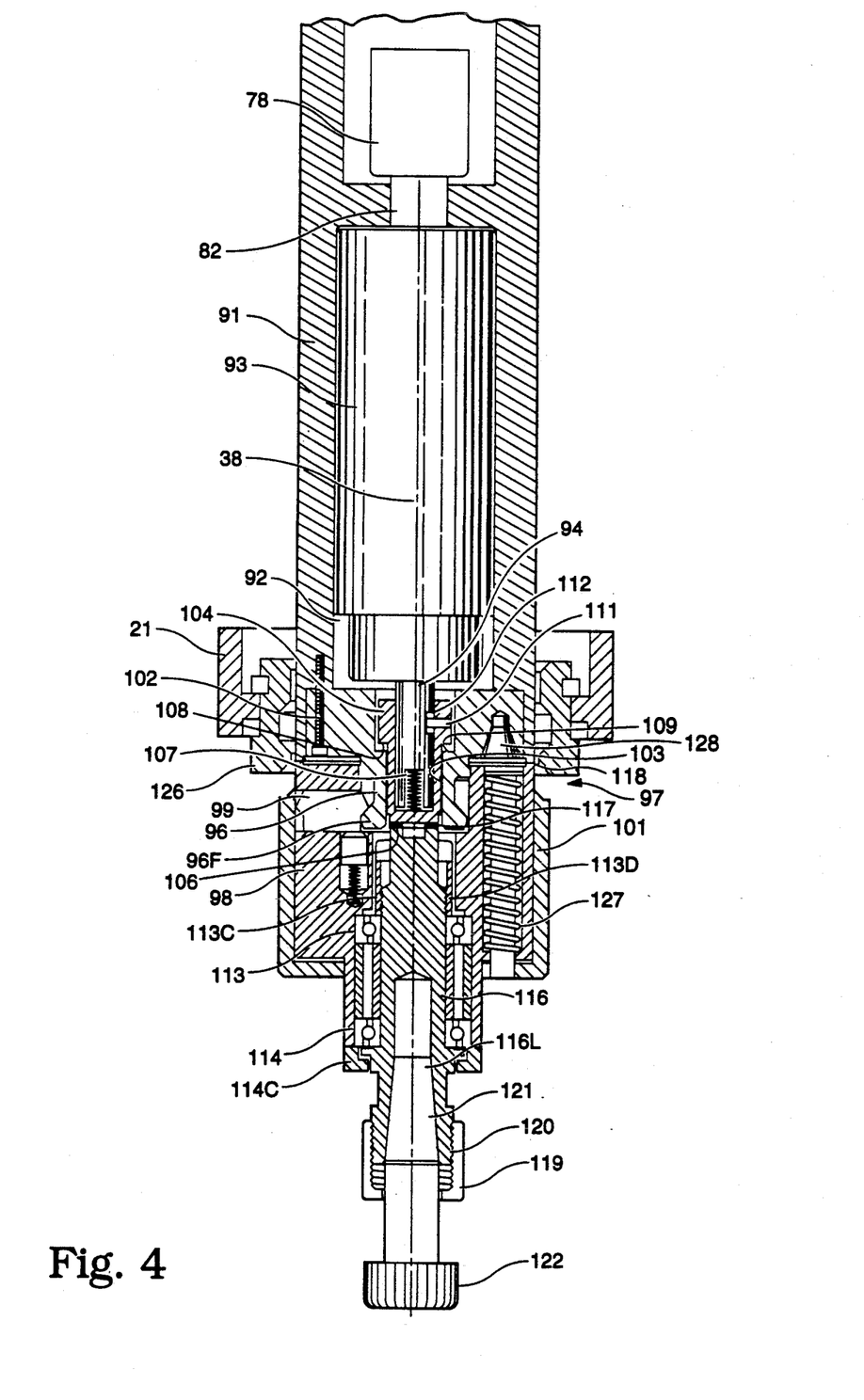
FIG. 4 is a vertical section of the lower portion similar to FIG. 2B but showing an alternative embodiment of the spindle and toolholder assembly.

Referring now to FIG. 4, it should be understood that the spindle at the rotary seal 76 and everything above it are the same as in the embodiment shown in FIGS. 2A and 2B. But in this case the lower portion of the spindle is somewhat different. This spindle 91 has a cylindrical cavity 92 therein at the lower end of the passageway 82 and which receives an air motor 93 secured in the cavity by a press fit of its outer cylindrical surface with the inner cylindrical surface of the cavity 92, or otherwise. The motor has an output shaft 94 at its lower end. A coupling plug 96 is mounted in a pocket in the bottom of the spindle and has exterior configuration at its lower end that is essentially the same as the coupling plug 19 in the previously described embodiment and coupling plug 36 in the aforementioned U.S. Pat. No. 3,999,769. Thus, it cooperates with the toolholder assembly 97 in this embodiment in the same way as the coupling plug cooperates with the toolholders of FIGS. 1 and 2A and the toolholders in the aforementioned U.S. Pat. No. 3,999,769. In the present instance, the toolholder body 98 is comparable in many respects to the toolholder body 60 of the aforementioned patent, and includes three circularly spaced locking members 99 (of which only one is shown) controlled by an annular sleeve 101 in the same way that annular sleeve 90 controls locking member 78 of the toolholder in that patent. In this case, however, the coupling plug unit is fastened in the bottom of the spindle by several circularly spaced screws such as 102 and has a central aperture 103 therein. This aperture receives the cylindrical lower portion of a face clutch 104 having teeth 106 on its lower end. A compression spring 107 is received in a downwardly opening pocket at the bottom of the air motor shaft 94 and engages the upper face of the lower end of the face clutch, thereby urging the face clutch in a downward direction. While FIG. 4 shows the toolholder assembly 97 secured to the lower end of the spindle, separation of the toolholder from the spindle permits the spring 107 to push the face clutch downward until the shoulder 108 thereof abuttingly engages the shoulder 109 in the coupling plug. Rotation of the clutch 104 with respect to the motor shaft 94 is prevented by a set screw 111 threaded in the face clutch wall and extending into a vertically extending groove 112 in the shaft 104.

In this case, instead of the toolholder assembly 97 simply having a central aperture to receive the upper end of a tool to be held in with a set screw, it has upper and lower pre-loaded ball bearing assemblies 113 and 114 supporting a toolholder spindle 116 which has its central axis colinear with the axis 20 of spindle 91. The outer races are clamped in the toolholder body 98 by ring 114C fastened to the lower end of the body by circularly spaced screws (not shown). The inner races are clamped to the spindle by nut 113C screwed onto threads at 113D on the toolholder spindle 116.

The upper end of toolholder spindle 116 has teeth at 117 engaged with the teeth 106 of the face clutch, with the spring 107 maintaining engagement of the teeth. The locking members 99 retain the toolholder on the coupling plug with the upper end of the toolholder body in abutting relationship with the lower shoulder of the spindle at the plane 118. In the illustrated example, the lower end portion 116L of the toolholder spindle 116 is split, forming a collet with a nut 119 threaded on the exterior surface of the collet at 120 to close and tighten the collet on the tapered end 121 of the milling cutter 122.

The toolholders according to this embodiment of this invention are mounted in retaining rings 126 in the turret plate 21 in the same manner as in the U.S. Pat. No. 3,999,769. When a toolholder is advanced to a position under the spindle, the spindle is driven downward by the ball nut whereupon the coupling plug flange 96F moves under the ledge of the locking members 99. Further downward drive of the spindle cams the locking members inward from the retaining ring as the toolholder is pushed out of the retaining ring to the departure point as shown in FIG. 4. It also enables the spring 127 to pull the sleeve 101 upward to encircle the outer ends of the locking members 99 and retain them securely on the coupling plug flange. As it does so, the circularly spaced spring-loaded locating and drive pins 128 (only one shown) are received in the mating sockets of the coupling plug as described for pins 130 and 132 in the aforementioned '769 patent. The toolholder is thus secured and properly indexed to the bottom of the spindle, and the locking members are retained in place by the sleeve 101. Meanwhile, the spring clutch has engaged the upper end of the toolholder spindle 116. The spindle can be driven further downward to the extent needed to engage the cutter 122 with the workpiece 13 and continue driving it downward if and to the extent desired with the spindle being rotated at the desired speed by the spindle main drive motor. If a higher speed is needed, the air motor can be driven at the desired speed which, in addition to the spindle speed, provides the desired cutter speed. The air motor and main spindle drive motor can be operated simultaneously or independently, as desired. The table movement can be directed as desired by the controller. When the machining operation with this particular tool has been completed as desired, the spindle is retracted and the toolholder is returned to secure storage in the turret plate, whereupon the turret plate can be rotated to place whichever of the other tools therein is to be next used, in position under the spindle. Of course it should be understood that this spindle can operate with toolholders of the U.S. Pat. No. 3,999,769, as well as the spindle bearing toolholders of FIG. 4 of this application, and in any desired combination. Also it should be understood that the toolholders such as in FIG. 4 can be provided with a chuck or other tool gripping arrangement in the toolholder spindle itself, as desired.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In a machine having a frame and a spindle for driving a tool in rotation, the improvement comprising:
    an elongate drive sleeve having a longitudinal axis and rotatably mounted in the frame to rotate about its axis;
    a spindle received in the sleeve and coupled to the sleeve to rotate with the sleeve when the sleeve is rotated and the spindle being axially movable in the sleeve relative to the sleeve;
    a first spindle drive motor coupled to the sleeve to drive the sleeve and, thereby, the spindle, in rotation;
    a screw axially aligned with and coupled to one end of the spindle to drive the spindle axially, the screw having rotation limiting means thereon to allow differential rotation of the spindle and screw;
    a nut rotatably mounted to the frame to rotate about its axis and engaged with the screw to axially advance and retract the screw and thereby, the spindle, in response to rotation of the nut in one and the opposite rotational direction about its axis; and
    a second motor coupled to the nut to rotate the nut for axial drive of the spindle.

2. The improvement of claim 1 and wherein:
    the sleeve is axially confined in the frame to prevent axial movement of the sleeve in the frame.

3. The improvement of claim 2 and further comprising:
    first and second axially spaced bearings mounted in the frame and both radially and axially locating the sleeve in the frame and preventing axial movement of the sleeve in the frame.

4. The improvement of claim 2 and wherein:
    the spindle is fittingly received in the sleeve and is slidable longitudinally in the sleeve as the spindle is driven in rotation about the axis.

5. The improvement of claim 1 and further comprising:
    a coupling plug at the other end of the spindle for connection to a toolholder.

6. The improvement of claim 5 and further comprising:
    storage means coupled to the frame; and
    a plurality of toolholders stored in the storage means and positionable by the storage means, one at a time, in alignment with the coupling plug to enable the coupling plug, during axial movement of the spindle by driving the nut in the one rotational direction, to connect to and drive the toolholder out of the storage means and cause a tool in the toolholder to engage and operate on a workpiece and, by driving the nut in the opposite rotational direction, to retract the toolholder into the storage means and then disconnect the coupling plug from the toolholder.

7. The improvement of claim 1 and further comprising:
   a toolholder to hold a workpiece treating tool; and
   a tool drive motor coupled to the spindle and the toolholder for rotation of the tool drive motor by the spindle and rotation of the tool by the tool drive motor whereby the tool is positively rotatable at a speed different from the rotational speed of the spindle.

8. The improvement of claim 7 and wherein:
   the tool drive motor is located in the spindle and has an output member;
   a second spindle is mounted in the toolholder; and
   the output member and the second spindle have facing interengaging surfaces whereby the tool drive motor drives the second spindle.

9. The improvement of claim 8 and further comprising:
   a coupling plug at the other end of the first-mentioned spindle for connection of that spindle to the toolholder.

10. The improvement of claim 9 and wherein:
    the interengaging surfaces include a clutch mounted to the motor output member and the second spindle and disengaged when the toolholder is disconnected from the coupling plug.

11. The improvement of claim 10 and wherein the clutch includes:
    a first, spring-loaded face clutch portion mounted at an end of the motor output member and substantially non-rotatable with respect to the motor output member; and
    a second face clutch portion mounted to an end of the second spindle and substantially non-rotatable with respect to the second spindle.

12. The improvement of claim 11 and wherein:
    the second spindle has tool a receiver gripper thereon at the other end thereof.

13. The improvement of claim 1 and wherein the rotation limiting means comprises:
    a first clutch member fixed to the screw;
    a second clutch member non rotatably associated with the frame but movable therein axially with the screw; and
    detent means in the first and second clutch members and normally preventing rotation of the first clutch member relative to the second clutch member.

14. The improvement of claim 13 and wherein the detent means comprises:
    a spring loaded detent pin mounted in the second clutch member and having an end portion resiliently urged into a detent recess in the first clutch member; and
    the end portion being shaped to enable the pin to be pushed out of the recess upon application of torque above a predetermined limit to the screw by the nut.

15. The improvement of claim 14 and wherein:
    the nut is a ball nut and the screw is a ball screw.

16. The improvement of claim 1 and further comprising:
    a fluid conveying passageway extending longitudinally inside the spindle from the screw toward a point at the other end of the spindle.

17. The improvement of claim 16 and wherein:
    the passageway extends to a point at the other end of the spindle.

18. The improvement of claim 16 and further comprising:
    a fluid powered motor secured inside the spindle;
    the passageway extending into communication with the fluid powered motor to convey fluid to drive it.

19. The improvement of claim 18 and further comprising:
    a coupling plug fixed to the other end of the spindle for automatic connection to any one of a plurality of tool holding toolholders in a magazine, one-at-a-time, as the spindle is advanced axially by the nut to push the toolholder out of the magazine toward a workpiece.

20. The improvement of claim 19 and wherein:
    the coupling plug has a central aperture therein;
    the fluid powered motor has an output member extending into the aperture;
    a movable toolholder magazine is coupled to the frame;
    a plurality of tool holding toolholders is held in the magazine;
    at least one of the toolholders in the magazine has a toolholder spindle rotatably mounted therein;
    a clutch is provided on the output member and toolholder spindle and engaged when the first-mentioned spindle pushes the toolholder out of the magazine; and
    a workpiece treating tool is secured in the toolholder spindle.

21. The improvement of claim 20 and wherein:
    the machine spindle is vertical; and
    the machine has a workpiece holder mounted to the frame under the spindle and movable in translation in a horizontal plane to move a workpiece into various positions under the spindle for treatment by various ones of the tools, one-at-a-time.

* * * * *